United States Patent [19]
Jabusch

[11] Patent Number: 5,944,277
[45] Date of Patent: Aug. 31, 1999

[54] SELF-LOCKING BELT REEL WITH RETRACTOR-TYPE CHANGEOVER CONTROL

[75] Inventor: Ronald Jabusch, Elmshorn, Germany

[73] Assignee: Autoliv Development AB, Vargarda, Sweden

[21] Appl. No.: 09/051,730

[22] PCT Filed: Oct. 17, 1996

[86] PCT No.: PCT/EP96/04508

§ 371 Date: May 20, 1998

§ 102(e) Date: May 20, 1998

[87] PCT Pub. No.: WO97/15475

PCT Pub. Date: May 1, 1997

[30] Foreign Application Priority Data

Oct. 11, 1995 [DE] Germany .......................... 195 39 284

[51] Int. Cl.[6] .................................................. B60R 22/36
[52] U.S. Cl. ............................................................. 242/382.2
[58] Field of Search ............................ 242/382.1, 382.2, 242/382.4; 297/476, 478, 479, 480; 280/806

[56] References Cited

U.S. PATENT DOCUMENTS

| | | | |
|---|---|---|---|
| 4,817,885 | 4/1989 | Matsumoto | 242/382.2 |
| 4,948,066 | 8/1990 | Matsumoto et al. | 242/382.2 |
| 5,232,177 | 8/1993 | Hibata | 242/382.2 |
| 5,271,578 | 12/1993 | Jabusch . | |
| 5,294,070 | 3/1994 | Sugano et al. | 242/382.2 |
| 5,495,993 | 3/1996 | Hibata | 242/382.2 |
| 5,518,197 | 5/1996 | Gray | 242/382.2 |
| 5,772,145 | 6/1998 | Bareiss et al. | 242/382.2 |
| 5,794,879 | 8/1998 | Huber | 242/382.2 |
| 5,820,059 | 10/1998 | Hibata et al. | 242/382.4 |

FOREIGN PATENT DOCUMENTS 4314153  11/1994  Germany .

*Primary Examiner*—John P. Darling
*Attorney, Agent, or Firm*—Robert W. Becker & Associates

[57] ABSTRACT

A self-locking belt reel has a housing and a reeling shaft rotatably supported in housing. A vehicle sensitive, belt sensitive, or vehicle and belt sensitive control system for locking a movement of the reeling shaft is provided. The control system includes a control disk connected to the reeling shaft. A control pinion is connected to the control disk. A control member meshes with the control pinion. The control member is moveable from a rotational position into a locking position. The control member is moveable between a rotational position and a locking position, wherein in the rotational position the control member releases the control disk and wherein in the locking position the control member locks the control disk to block rotation of the reeling shaft. The control member is in the rotational position when the belt is in an initial state wound onto the reeling shaft. The control member is in the locking position when the belt has been removed by a predetermined amount from the reeling shaft. In the locking position a toothing of the control member is locked against rotation relative to the housing upon further removal of the belt from the reeling shaft.

4 Claims, 3 Drawing Sheets

SELF-LOCKING BELT REEL WITH RETRACTOR-TYPE CHANGEOVER CONTROL

BACKGROUND OF THE INVENTION

The invention relates to a self-locking belt reel, especially for motor vehicles, with a vehicle-sensitive and/or belt-sensitive control system for the locking member, which in a situation in which the reel needs to be locked prevents further rotation of the belt reeling shaft. It comprises a winding spring acting onto the belt reeling shaft and further comprises a control device which, when the belt is wound onto the reeling shaft provides a release position for the control disc rotating with the belt reeling shaft of the vehicle-sensitive and/or belt-sensitive control system of the belt reel. When the belt has been removed, it secures the control disc against further rotational movement resulting in the blocking of the belt reel.

A belt reel with the aforementioned features is described in German patent 41 32 876 whereby the control device comprises two meshing toothings with respectively arranged switching cams which, at predetermined switching states, engage one another and cause blocking of the control disc. In more detail, a first gear wheel is arranged on the belt reeling shaft which, depending on the switching state, meshes with one of two further gear wheel positioned at the two ends of a pivotably supported rocker on the belt reeling shaft. The three gear wheels each comprise a switching cam whereby two respective switching cams at predetermined removal states will engage one another so that pivoting of the rocker will result from further rotation of the belt reeling shaft upon removal of belt or spring action. The rocker, in turn, moves a switching lever cooperating with the outer toothing of the control disc between a release position and a locking position for the control disc, whereby stopping of the control disc in its rotational movement relative to further rotation of the belt reeling shaft results in pivoting of the locking member and thus locking of the belt reel. In this embodiment of the belt reel, it is achieved that, when a predetermined amount of belt has been removed, the locking system of the belt reel is constantly activated so that each further belt removal results in a locking action of the belt reel while return of the belt and a reverse movement of the belt reeling shaft past the correlated switching position results in a release of the blocking system.

The known belt reel has the disadvantage that for realization of the disclosed control for switching of the belt reel a plurality of components such as rocker, gear wheels, pivotable switching lever, and spring are required whereby their manufacture and mounting is complicated. The invention has the object to simplify for a belt reel having the aforementioned features the control device for switching.

SUMMARY OF THE INVENTION

The solution to this object results including advantageous embodiments and developments of the invention from the contents of the patent claims which follow the description.

The basic idea of the invention is that as a control device the control disc has a pinion toothing with a center point centrally arranged relative to the axis of rotation of the control disc. The pinion toothing meshes constantly with a control member which is positioned so as to pivot between a rotational position and a locking position at the belt reel, whereby the movement of the control member results in locking, respectively, release of the rotational movement of the control disc. The invention has the advantage that, in addition to the pinion toothing provided at the control disc, only one single additional component in the form of a control member displaceably positioned at the belt reel is required so that the construction of the belt reel, respectively, its control device and mounting is simplified. A further advantage is that the rotational movement of the belt reeling shaft is detected at the control disc positioned externally on the reeling shaft so that access to the end of the shaft itself is eliminated and the width of the belt reel is reduced.

When applying the principle known from German patent 41 32 876 in regard to meshing toothings, it is suggested according to one embodiment of the invention that the control member is embodied as a gear wheel with an inner toothing whereby the movement of the gear wheel between a rotational position and a blocking position is effected by engagement of switching cams positioned, on the one hand, on the pinion toothing and, on the other hand, on the gear wheel.

According to the invention it may provided that in its blocking position the gear wheel with the outer toothing is in engagement with a stationary blocking abutment. Since in this manner the moveable gear wheel is moved and thus secured at a stationary blocking abutment, a moveable lever is no longer necessary and a respective simplification of the construction of the belt reel results.

According to one embodiment of the invention the gear wheel is secured at the inner side of a cover that covers the control side of the belt reel so that the constructive width of the belt reel is expediently reduced. For securing the gear wheel at the cover, it may be provided that the gear wheel is secured by two hooks of the cover that span the gear wheel width at its circumference and allow movement of the gear wheel.

In order to better be able to control the position of the gear wheel in the respective switching states, according to one embodiment of the invention it may be provided that the gear wheel in its rotational position and in its blocking position is secured by spring elements whereby the spring elements elastically engage one of two circular depressions of the cover.

One expedient embodiment of the invention suggests that the pinion toothing is a unitary part of the control disc, so that as an additional "loose" component only the gear wheel must be mounted in the hooks of the cover.

BRIEF DESCRIPTION OF THE DRAWINGS

In the drawing one embodiment of the invention is represent which will be explained in the following. It is shown in.

DESCRIPTION OF PREFERRED EMBODIMENTS

Figure 1:
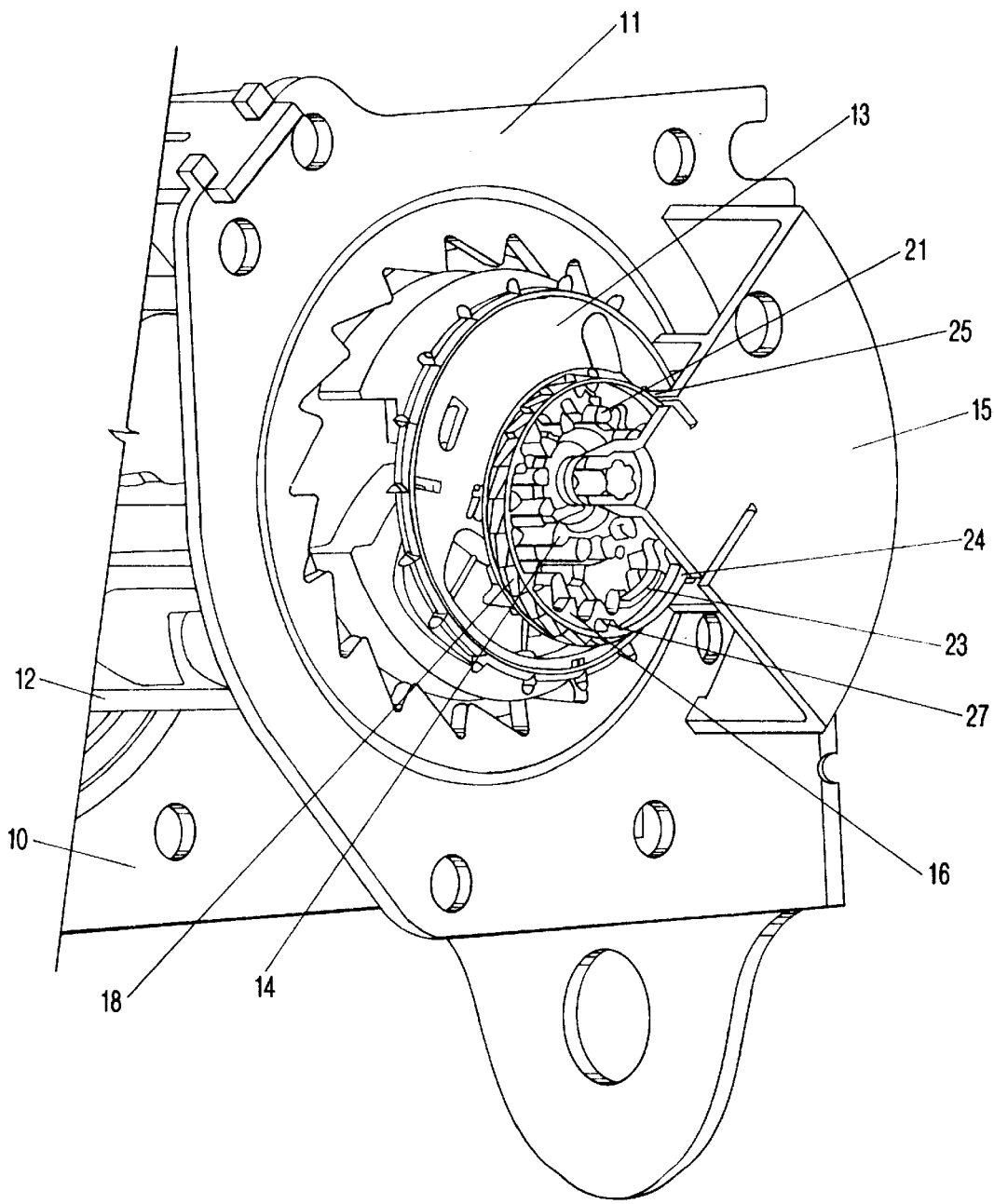
FIG. 1 the control side of a self-locking belt reel in a perspective view.

As can be seen in FIG. 1, a belt reeling shaft 12 is supported in a U-shaped belt reel housing 10 whereby the end of the belt reeling shaft penetrates the corresponding U-leg 11 of the housing 10 whereby onto the respective end of the belt reeling shaft 12 a control disc 13 is placed. In a non-represented manner, the control disc 13 represents the belt-sensitive, respectively, vehicle-sensitive control system for blocking the belt reel, as is well known from the prior art.

A pinion toothing 14 is provided as a unitary part of the control disc 13 and has a center point 19 (FIGS. 2 through 4) centrally arranged relative to the axis of rotation of the control disc.

The cover 15 that covers the control side of the belt reel is partially shown in FIG. 1 and covers the U-shaped leg 11 of the housing 10. In the interior a gear wheel 16 is arranged so as to be moveable which will be explained in the following. The gear wheel 16 meshes at all times with an inner toothing 17 of the pinion toothing 14. Furthermore, the gear wheel 16 has an outer toothing 18 which in the blocking position of the gear wheel 16 to be explained in the following can engage a stationary spring-elastic blocking abutment 24 arranged at the inner side of the cover 15. The center point 20 of the gear wheel is displaced relative to the center point 19 of the pinion so that a displacement of the gear wheel 16 relative to the pinion toothing 14 is possible.

The pinion toothing 14 comprises a switching cam 21 in the form of a raised tooth and the gear wheel 16 in the area of the inner toothing 17 meshing with the pinion toothing 14 has an activation switching cam 22 and a deactivation switching cam 23. As a function of the numbers of rotation of the belt reeling shaft and thus of the control disc 13 supporting the pinion toothing 14 the switching cam 21 of the pinion toothing 14 engages either the activation cam 22 or the deactivation cam 23 of the gear wheel 16 in a manner to be described in the following.

Figure 5:
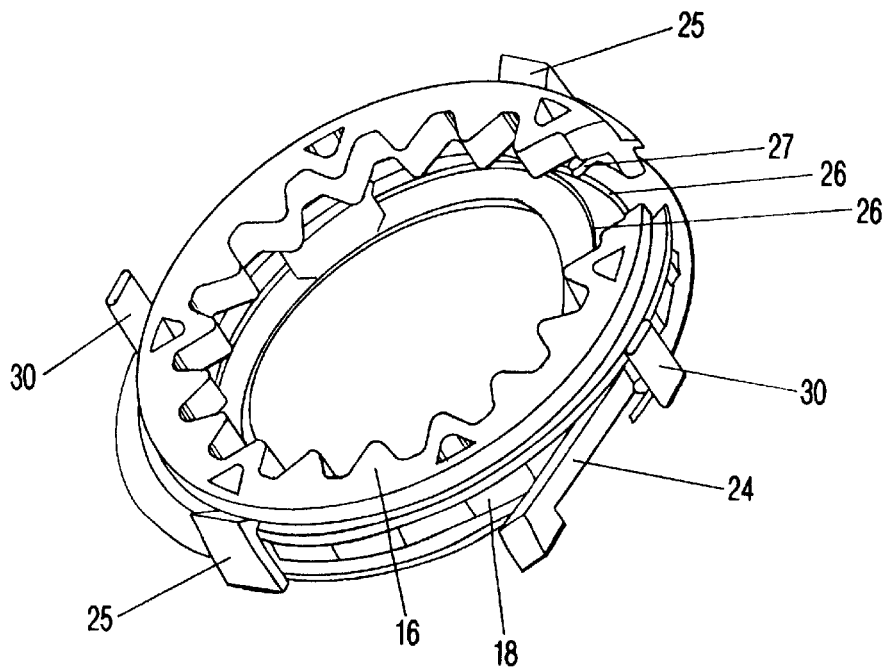
FIG. 5 the gear wheel including its holders in a perspective individual representation.

As can be seen in FIGS. 1 and 5, the gear wheel 16 is secured by two hooks 25 diametrically oppositely arranged at the inner side of the cover 15. The gear wheel is moveable between the hooks 25. For guiding the rotational movement of the gear wheel 16 in the rotational position as well as in the locking position, the inner side of the cover 15 is provided with a respective annular depression 26 which allows the two possible positions of the gear wheel 16. The gear wheel 16 can rotate in the depressions with the aid of the spring elements 27. These spring elements 27 allow a jumping of the gear wheel 16 upon its movement from one depression 26 into the other depression 26 according to the respective switching states. Two stops 30 limit in addition to the depressions 26 the movement of the gear wheel 16.

Subsequently, the function of the belt reel will be described. In the initial position with the belt wound onto the shaft, the removal of belt results in a rotation of the shaft 12 and thus of the control disc 13. Upon rotation of the control disc 13 the pinion toothing 14 engages the gear wheel 16 which in the rotational position represented in FIG. 2 rotates in the respective depression 26 within the cover 15.

Figure 2:
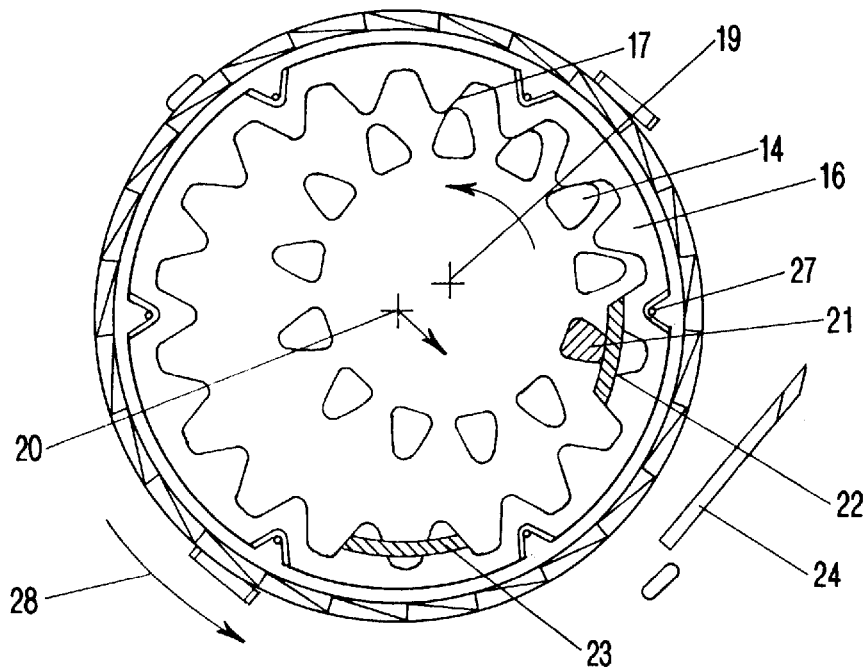
FIG. 2 the control device for switching the belt reel in a schematic plan view before activation.
Figure 3:
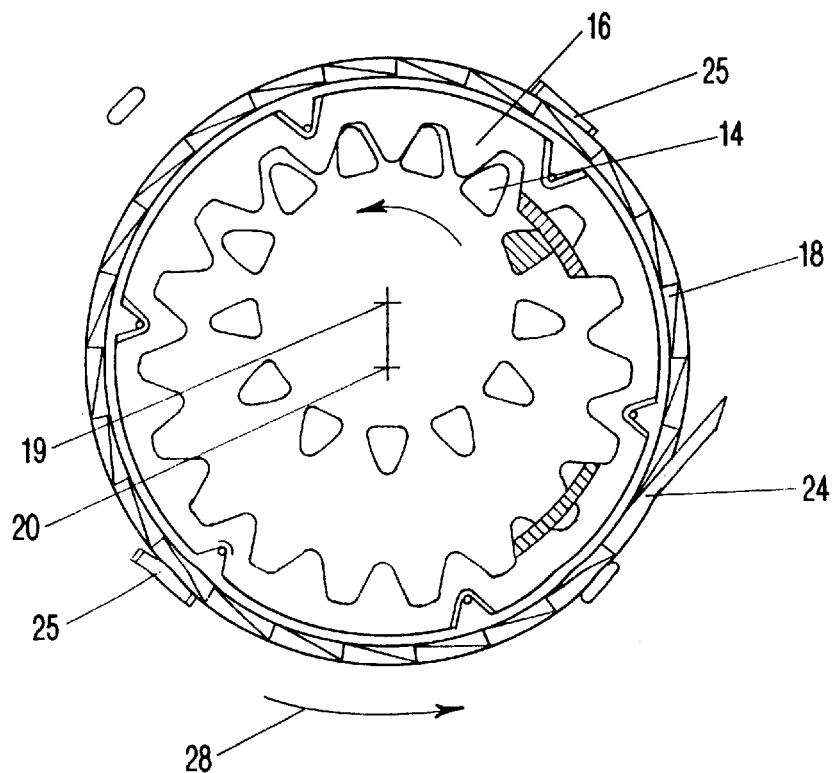
FIG. 3 the control device according to FIG. 2 in the state of activation.

After a predetermined number of revolutions of the control disc 13 corresponding to the desired belt removal, the switching cam 21 of the pinion toothing 14 engages the activation cam 22 arranged at the gear wheel 16 so that a further rotation of the control disc 13 and thus of the pinion toothing 14 results in a movement of the gear wheel 16 with a displacement of its center point 20 relative to the center point 19 of the pinion toothing 14, as can be seen when comparing FIG. 2 (rotational position of the gear wheel 16) with the FIG. 3 (locking position of the gear wheel 16). After corresponding movement of the gear wheel 16 its outer toothing 18 abuts the stationary locking abutment 24 so that the gear wheel 16 is prevented from rotating further in the removal direction of the belt (arrow 28). Due to the meshing connection of the gear wheel 16 with the pinion toothing 14, locking of the gear wheel 16 results in locking of the control disc 13 due to the stationary blocking abutment 24. When the belt reeling shaft 12 is further rotated, the relative movement between the control disc 13 and the belt reeling shaft 12 results in a movement of the locking member and thus in blocking of the belt reel.

Figure 4:
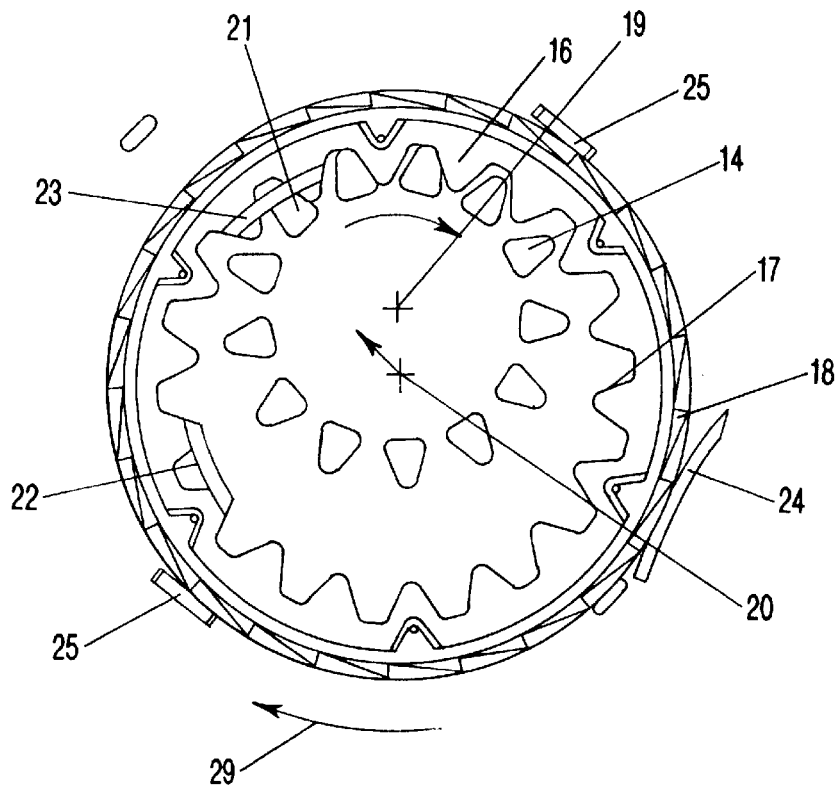
FIG. 4 the control device according to FIG. 3 at deactivation.

FIG. 4 shows the reverse switching whereby the belt is retracted onto the belt reel by rotation of the belt reeling shaft in the direction of arrow 29 (FIG. 4). Accordingly, the gear wheel 16 now rotates in the reverse direction whereby its outer toothing 18 can slide along the spring-elastic locking abutment 24 until the switching cam 21 of the pinion toothing 14 meets the deactivation cam 23 of the gear wheel 16 and the gear wheel 16 is thus pushed back into its initial position according to FIG. 2.

In this initial state the vehicle-sensitive, respectively, belt-sensitive control system is again functionally ready, i.e., the continuous blocking action is released.

The features disclosed in the above description, the patent claims, the abstract, and the drawings of the object of this application can be important individually as well as in any combination with one another for realizing the invention in its various embodiments.

The present invention is, of course, in no way restricted to the specific disclosure of the specification and drawings, but also encompasses any modifications within the scope of the appended claims.

I claim:

1. A self-locking belt reel comprising:

a housing;

a reeling shaft rotatably supported in said housing;

a vehicle sensitive, belt sensitive, or vehicle and belt sensitive control system for locking a movement of said reeling shaft;

said control system including a control disk connected to said reeling shaft;

a control pinion fixedly connected to said control disk such that said control disk and said control pinion rotate together;

a control member meshing with said control pinion;

said control member moveable between a rotational position and a locking position, wherein in said rotational position said control member releases said control disk and wherein in said locking position said control member locks said control disk to block rotation of said reeling shaft;

said control member being in said rotational position when the belt is in an initial state wound onto said reeling shaft;

said control member being in said locking position when the belt has been removed by a predetermined amount from said reeling shaft, wherein in said locking position a toothing of said control member is locked against rotation relative to said housing upon further removal of the belt from said reeling shaft.

2. A belt reel according to claim 1, wherein said control member is a gear wheel and wherein said toothing is an inner toothing of said gear wheel, wherein said gear wheel has switching cams and said control pinion has a switching cam, wherein said switching cams of said gear wheel and of said control pinion cooperate for switching said control member between said rotational and locking positions.

3. A belt reel according to claim 2, wherein said housing has a blocking abutment, wherein said gear wheel has an outer toothing that in said locking position engages said blocking abutment.

4. A belt reel according to claim 2, wherein said housing has a cover covering said control system and wherein said gear wheel is connected to an inner side of said cover.

\* \* \* \* \*

UNITED STATES PATENT AND TRADEMARK OFFICE
CERTIFICATE OF CORRECTION

PATENT NO. : 5,944,277
DATED : 08/31/99
INVENTOR(S) : Ronald Jabusch

It is certified that error appears in the above-identified patent and that said Letters Patent is hereby corrected as shown below:

On the title page, item
    [30] Foreign Application Priority Data: should read

-- Oct. 21, 1995 [DE] Germany..........195 39 284 --

Signed and Sealed this

Twenty-ninth Day of February, 2000

Attest:

Q. TODD DICKINSON

Attesting Officer      Commissioner of Patents and Trademarks